|  | United States Patent [19] | [11] | 3,959,511 |
|---|---|---|---|
|  | Balaz et al. | [45] | May 25, 1976 |

[54] METHOD OF MAKING A DRY FIBROUS MEAT-LIKE PET FOOD AND COMPOSITION THEREOF

[75] Inventors: Alexander Balaz, Barrington; David P. Bone, Palatine; Edward L. Shannon, Barrington, all of Ill.

[73] Assignee: The Quaker Oats Company, Chicago, Ill.

[22] Filed: June 12, 1974

[21] Appl. No.: 478,755

[52] U.S. Cl............................. 426/549; 426/550; 426/560; 426/805
[51] Int. Cl.² ........................................ A23L 1/10
[58] Field of Search ........... 426/152, 342, 343, 364, 426/805, 549, 560, 615, 618, 623, 635, 656

[56] References Cited
UNITED STATES PATENTS

| 3,202,514 | 8/1965 | Burgess et al. | 426/72 |
|---|---|---|---|
| 3,380,832 | 4/1968 | Bone | 426/272 X |
| 3,467,525 | 9/1969 | Hale et al. | 426/805 |
| 3,852,483 | 12/1974 | Oborsh | 426/152 |

*Primary Examiner*—Raymond N. Jones
*Attorney, Agent, or Firm*—Mathew R. P. Perrone, Jr.; Donnie Rudd

[57] ABSTRACT

A method is described for producing a dry pet food having a moisture content of less than 15 percent by weight. The dry pet food has a fibrous meat-like texture even though it contains a substantial amount of amylaceous ingredient. This texture is obtained by utilizing specific types of proteinaceous adhesives in conjunction with plasticizing agents and processing in a manner to form fibers.

12 Claims, 2 Drawing Figures

METHOD OF MAKING A DRY FIBROUS MEAT-LIKE PET FOOD AND COMPOSITION THEREOF

BACKGROUND OF THE INVENTION

This invention relates to dry pet food that is soft, elastic, and which has a substantially fibrous meat-like texture and appearance and which has a moisture content of less than 15 percent by weight. In co-pending application U.S. application Ser. No. 478,759 by Bone et al., a dry pet food having a soft, fibrous texture is disclosed. While the Bone et al. process yields a soft, elastic, and meaty pet food that maintains its texture during normal storage, i.e., up to 24 months, it does so by requiring that the amylaceous ingredients preferably are eliminated or kept to a level not exceeding 25 percent of the product by weight. The Bone et al. process by the aforesaid patent application therefore suffers from the drawback of requiring ingredients that are relatively expensive inasmuch as amylaceous ingredients are generally the least expensive of pet food ingredients. Conventional dry pet foods, however, that contain large amounts of amylaceous ingredients are characterized as having hard, brittle structure and only a nominal resemblance to meat. Due to the hard, brittle nature of these dry pet foods, it is often necessary to moisten them or mix them with moist foods in order to increase their palatability. It is apparent, therefore, that there is a great need for a dry pet food containing amylaceous ingredients in excess of 25 percent by weight yet yielding a pet food that has a soft, meaty appearance, and texture over a storage period of up to 12 months.

SUMMARY OF THE INVENTION

It is, therefore, an object of this invention to provide a method of producing a pet food having a soft, elastic, substantially meat-like texture and appearance.

Yet another object of this invention is to provide a pet food containing substantial amounts of amylaceous ingredients that is substantially meat-like in texture and appearance.

Yet another object of this invention is to provide a processed pet food which ranks high in palatability and acceptability to animals.

These and other objects of this invention are accomplished by mixing a substantial amount of amylaceous ingredients along with conventional dry pet food ingredients, specific proteinaceous adhesives and plasticizing agents, and further processing the mixture to yield semi-moist like yet dry pet food resembling meat in both texture and appearance.

BRIEF DESCRIPTION OF THE DRAWINGS

This invention may be more fully illustrated but is not limited by the enclosed drawings wherein.

DETAILED DESCRIPTION OF THE INVENTION

Figure 1:
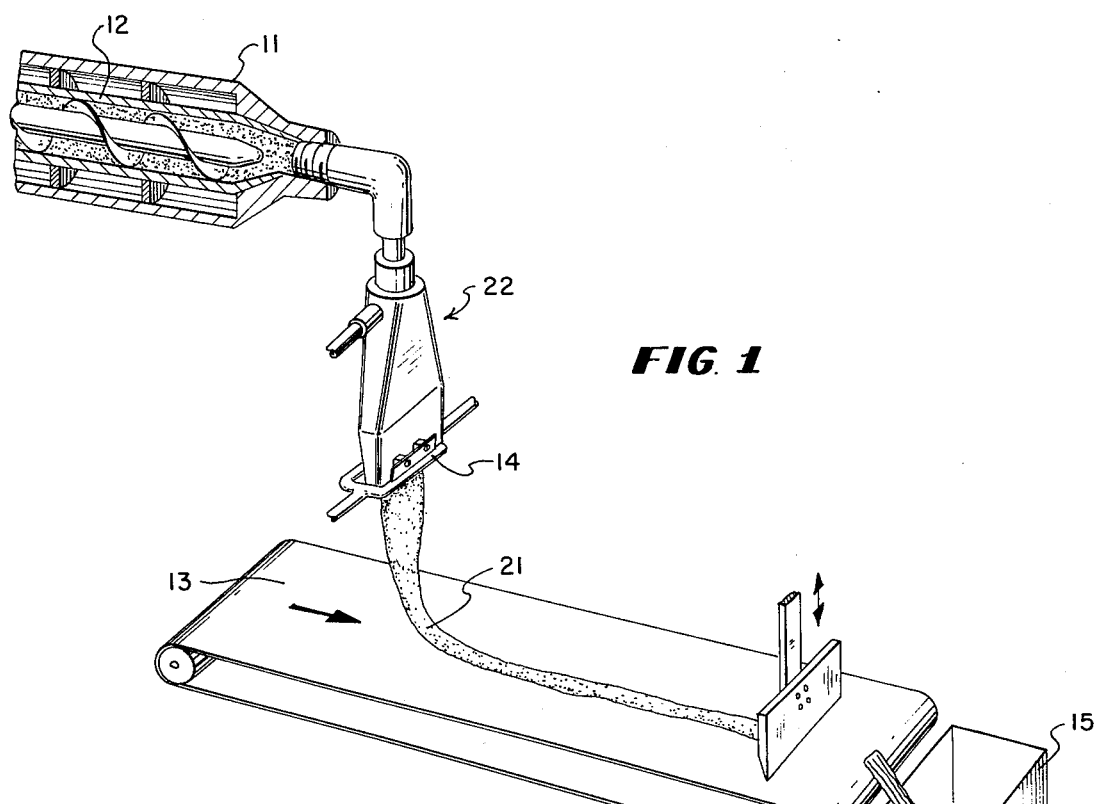
FIG. 1 illustrates a perspective view of an apparatus used to carry out the process of this invention.
Figure 2:
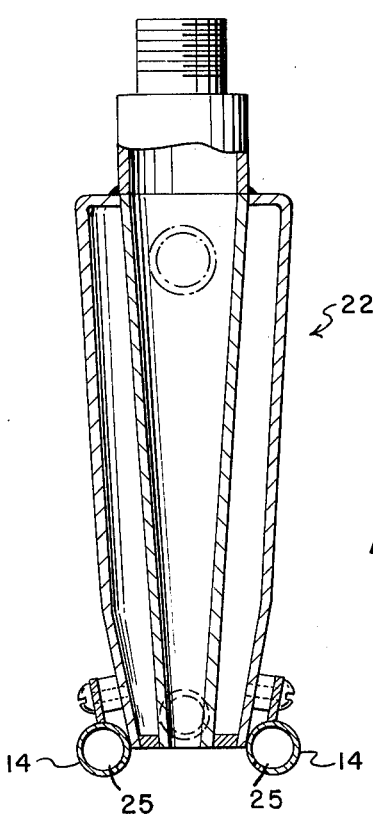
FIG. 2 illustrates an extruder die nozzle combination utilized in the formation of fibers from the extrudate.

By "dry pet food" is meant one that has a moisture content less than 15 percent by weight. Hereinafter, all percentages referred to are understood to be by weight unless specified otherwise and are based on the weight of the final product. These foods are composed of amylaceous ingredients such as cereal grains, flours, or starch, fats, sugar, a proteinaceous adhesive, and a plasticizing agent. Additional protein source ingredients to provide protein other than that obtained from the proteinaceous adhesive may be employed in order to satisfy legal and nutritional requirements for protein quantity and quality. While the quantity of protein source, fat, and sugar is considered to be within the skill of the art, a typical quantitative range of those ingredients includes from about 0 to 35 percent protein source ingredient, from about 3 to 15 percent fat, and from 0 to about 35 percent sugar. Vitamins, minerals, and other food supplements may be added as well.

By the term "protein source ingredients" is meant those foodstuffs normally containing 20 percent or more protein by weight. Examples of protein source ingredients are soybean oil meal, soybean flour, soy protein concentrates, soy protein isolates, meat meal, meat and bone meal, fish meal, blood meal, dried blood plasma, yeast, milk proteins, dried skimmilk, cottonseed meal, cottonseed flour, cottonseed protein isolate, peanut meal, peanut flour, peanut protein isolate, corn germ, corn germ meal, wheat germ, wheat germ meal, corn gluten feed, corn gluten meal, corn distiller's dried grains, dried corn distiller's solubles, poultry by-product meal, and any other edible proteinaceous foodstuff.

Fresh meat and meat by-products may also be employed and are particularly useful in imparting palatability. The term "meat" is understood to apply to the flesh of cattle, swine, sheep, goats, horses, whale, and other mammals, poultry, and fish. The term "meat by-products" includes such substituents as are embraced by that term in the *Definition of Feed Ingredients* published by the Association of American Feed Control Officials, Inc.

By the term "sugar" is meant any known sugar utilized in the food art.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of these cereal grains such as wheat feed flour, wheat middlings, wheat mixed feed, wheat shorts, wheat red dog, oat groats, hominy feed, and any other such material. Also included as sources of amylaceous ingredients are the tuberous foodstuffs such as potatoes, tapioca, or the like. Other examples of amylaceous ingredients are the various edible grain or tuberous starches and modified starches.

By the term "modified starch" we mean the use of thin-boiling (acid or oxidized treatment) or thick-boiling regular grain or tuberous starch, high amylose corn starch or waxy starch, or combinations thereof, either pregelatinized before, after, or distinct from the treatment with cross-linking agents such as sodium trimetaphosphate or phosphorus oxychloride alone or in conjunction with alkylating agents such as propylene oxide, or acetylating agents such as acetic anhydrides.

Briefly stated, the novel aspects of the present invention involve incorporating into the pet food a substantial amount of one or more amylaceous ingredients — in excess of 25 percent of the product up to about 50 percent of the product — along with a proteinaceous adhesive ranging from 10 to 25 percent in conjunction with one or more compatible plasticizing agents and then processing the ingredients in a manner to yield products that are substantially soft, fibrous, stringy, and meat-like in form and appearance. Said processing requires the use of a novel die such as described by our U.S. application Ser. No. 478,759, above cited, filed herewith.

Proteinaceous adhesives are of two general classes, natural and modified. Examples of natural proteinaceous adhesives are collagen, albumens, and casein and its single salts such as sodium caseinate, potassium caseinate, calcium caseinate, ammonium caseinate and magnesium caseinate. Examples of proteinaceous adhesives derived by modification of natural proteins are alkali modified oil seed vegetable proteins such as alkali modified soy protein isolates and proteinates, alkali modified soy flours and soy concentrates, alkali modified wheat gluten, alkali modified cottonseed flour, and cottonseed concentrates and cottonseed protein isolates, alkali modified peanut flour, peanut isolates and concentrates and other alkali modified proteins such as contained or derived from products such as yeast, blood, albumin, keratins, myosin, and other food proteins wherein the modification consists of the salts or proteinates such as sodium caseinate, calcium caseinate, and the like.

The term "modified protein" and "alkali modified protein" is used interchangeably herein. By modified or alkali modified protein is meant one that is subjected to an alkaline hydrolysis such as the alkaline hydrolysis of an oil seed vegetable protein such as that disclosed in U.S. application Ser. No. 478,751 filed June 12, 1975, now U.S. Pat. No. 3,917,877 by Kumar et al. which is hereby incorporated by reference. Generally this modification proceeds by forming an aqueous slurry of a protein material containing at least 50 percent protein. The pH of the slurry is then adjusted to a pH of from 7 to 10.5 by adding to the aqueous slurry an alkali metal carbonate. A pH of about 8 is preferable. The slurry is then heated to react the protein with the alkali metal carbonate. The reaction temperature required depends upon the specific protein used but generally ranges from 295°F. to 310°F. The slurry is then neutralized to a pH of from 6.6 to 7.0 by the addition of an edible acid. The slurry may be used as such, as an ingredient, or it may be dried to remove most of the water prior to use as an ingredient. If desired, the protein may be subjected to a fermentation with a yeast before subjecting the protein to the alkali modification.

Plasticizing agents utilized within the scope of this invention include glycerol, sorbitol, 1,3-butanediol, mannitol, propylene glycol, and other equivalent plasticizers suitable for food use. These may include glycerine, monoglycerides of fatty acids, corn molasses, sugar or corn syrups between 20–50 dextrose equivalent, fats, and oils. The quantitative range of plasticizing agent utilized in the present invention ranges from about 5 to about 25 percent of the product. When the level of amylaceous ingredients is low, say at about 26–27 percent of the product weight, a suitable texture and shelf-life may be obtained by using low to intermediate levels of plasticizing agent, i.e. 5 to 15 percent, whereas when the level of amylaceous ingredients is high, then it may be necessary to use higher levels of plasticizing agents. A preferred plasticizing agent for use in this invention is a combination of sorbitol and propylene glycol. The ratio of sorbitol to propylene glycol may be varied to adjust to the effects of differences in the kinds and levels of amylaceous and proteinaceous ingredients used. Generally, a 2:1 sorbitol to propylene glycol ratio is acceptable.

Generally, the dry pet food of this invention having a meat-like texture and appearance is produced by blending a dough from amylaceous ingredients, a protein source, proteinaceous adhesive, plasticizing agent, and ingredient water sufficient to provide a final composition containing less than 15 percent moisture, and an additional amount of water required for processing. It is to be understood that the determination of the amount of ingredient water required includes that water obtained from the other ingredients. For instance, if the other ingredients yield a water content of 3 percent and a final product having a 10 percent moisture content is desired, than 7 percent water in addition to that required for processing must be added. The dough is then cooked at a temperature between 160°F. to 290°F. The cooked dough is passed through a die and subjected to a continuous blast of air while passing through the die, causing a stretching of a portion of the product stream and the formation of fibrous structures while at the same time the action of said continuous blast of air cools the fibrous structures and sets them, thereby preventing their coalescing. The stream of fibrous product is transferred on a continuous conveyor and subdivided into pieces. While the temperature range of from about 160°F. to about 290°F. is sufficient to develop said fibrous meat-like texture and appearance upon cooking ssid dough the specific or preferred range is from about 235°F. to about 290°F. Preferably, the amount of water sufficient for processing is the equivalent of from about 0 parts per hundred to about 15 parts per hundred by weight of the product. When amounts of said process water are employed that are greater than the equivalent of 15 parts per hundred, it may be necessary to employ cooking temperatures less than 235°F. Furthermore, it may be necessary to include a drying step to adjust the moisture content of the cooked final product to less than 15 percent.

By the term "water required for processing" or "process water" is meant that amount of water that is added over and above formulation requirements and is a term well understood by those skilled in the art.

FIG. 1 represents a schematic illustration of the process of the invention. The blended ingredients are introduced into an extruder barrel 11 having a heated jacket 12, The discharge end of the extruder barrel 11 is fitted with a steam jacketed die 22 having cooling means 14 affixed thereon. The blended ingredients are conveyed through the extruder by an internal continuous screw and heat is transferred to the blend to achieve a cooking condition whereby the cooked extrudate is discharged through said die 22. Air is injected through the die in a continuous stream, said air emerging through perforations 25 within cooling means 14, said perforations having approximately a 45° orientation from the vertical flow of the product extrudate stream. The air emerging from said viscous perforations impinges upon the hot product extrudate stream and causes a portion of the product to form fibrous strands while simultaneously cooling and setting the formed fibers. For a product flow rate of about 200-lb. per hour air pressures of 40–90 psig have been found to be sufficient at an air flow rate of about 1 cubic foot per minute from each of the perforations in said cooling means 14. Integrity of the fibrous structure may also be improved by subjecting the product stream with cooling air by use of fans or other means immediately upon discharge from the extruder die.

The type of conveyor surface receiving the extrudate depends upon the specific formulation and appearance of the final product and is readily determinable by one of ordinary skill in the art. The rate of transport of the extrudate through this screw extruder onto the continuous conveyor immediate to the discharge of the cooker/extruder is dependant upon the specific formulation desired appearance of the final product as well as the specific type of extruder utilized and is felt to be within the skill of the art.

In order to further illustrate the novel aspects of the present invention, the following examples are presented. In the examples percentages are by weight based on the weight total of the ingredients used in processing.

EXAMPLE 1

| Ingredients | Percent |
| --- | --- |
| Oxidized starch | 19.158 |
| Collagen | 12.9 |
| Sucrose | 10.0 |
| Defatted soy flour | 9.15 |
| Wheat feed flour | 8.16 |
| Sorbitol, 70% | 5.0 |
| Meat and bone meal | 4.6 |
| Beef trimmings, ground | 4.5 |
| Lard | 4.5 |
| Dicalcium phosphate | 3.7 |
| Sodium caseinate | 2.5 |
| Propylene glycol | 2.5 |
| Poultry by-product meal | 2.1 |
| Sodium chloride | 0.85 |
| Vitamin-mineral premix | 0.60 |
| Potassium chloride | 0.37 |
| FD&C Red No. 40 | 0.01 |
| FD&C Violet lake No. 1 | 0.002 |
| Water | 10.4 |

The above ingredients comprising a formulation having about 27 percent amylaceous ingredients are blended in a ribbon type mixer to form a friable moist dough. Said dough is then passed into a 4-inch diameter Bonnet extruder and heated to a temperature ranging between 235°F. to 290°F. The cooked dough is passed continuously through a die fitted to the discharge end of the extruder barrel. Said die consists of a steam jacketed rectangular orifice or sheeting die, with steam pressure at 25 to 75 psig in said steam jacket. As the cooked extrudate exits from the sheeting die it is subjected to a continuous stream of air on the top and bottom sides of the exiting product sheet to give the extrudate a fibrous surface texture and meat-like appearance. The air nozzle producing the said air stream comprises a pair of pipes attached to the exit of the sheeting die and mounted parallel to one another and each pipe containing 21 perforations each having a diameter of 1/16 inch, each perforation passing one cubic foot of air per minute, said air having a temperature ranging from ambient to 250°F. The extrudate is discharged onto an air cooled conveyor, however, any conveyor system such as water cooled conveyors may be utilized within the scope of the invention. The speed of the belt is adjusted to obtain a steady flow of extrudate on the belt. A speed setting of 12 ft. per minute has been found to produce the product of the present example. The product is then cooled and cut into bite size pieces, said pieces having a soft, elastic, meat-like texture and appearance.

The following example comprises a product containing a high level of amylaceous ingredient.

EXAMPLE 2

| Ingredient | Percent |
| --- | --- |
| Oxidized Starch | 40.158 |
| Collagen | 12.75 |
| Sorbitol | 10.00 |
| Propylene Glycol | 5.00 |
| Meat and bone meal | 4.00 |
| Prime steam lard | 4.50 |
| Wheat feed flour | 3.16 |
| Dicalcium phosphate | 3.00 |
| Sodium caseinate | 2.50 |
| Poultry by-product meal | 2.10 |
| Sodium chloride | 0.85 |
| Vitamin-mineral premix | 0.60 |
| Potassium chloride | 0.37 |
| FD&C Red No. 40 | 0.01 |
| FD&C Violet No. 1 aluminum lake | 0.002 |
| Water | 10.4 |

The procedure of Example 1 is followed with the above ingredients and yields a product having a soft, stringy, meat-like appearance.

EXAMPLE 3

The procedure of Example 1 is followed replacing the collagen utilized in Example 1 by modified soy flour. In this example a soft product having a stringy appearance is obtained.

EXAMPLE 4

The procedure of Example 2 is followed replacing the collagen utilized in Example 2 by modified soy flour. In this example a soft product having a stringy appearance is obtained.

EXAMPLE 5

The procedure of Example 1 is followed utilizing the ingredients shown below to obtain a soft product having a stringy appearance.

| Ingredients | Percent |
| --- | --- |
| Defatted soy flour | 3.0 |
| Meat and bone meal Fitz No. 2 | 3.0 |
| Beef trimmings | 2.0 |
| Poultry by-products Fitz No. 2 | 3.8 |
| Collagen | 14 |
| Sorbitol | 4.0 |
| Corn syrup | 6.0 |
| Sodium caseinate | 7.0 |
| Dicalcium phosphate dihydrate | 2.3 |
| NaCl | 0.6 |
| KCl | 0.2 |
| Prime lard | 3.7 |
| FD&C Red No. 40 | 0.4 |
| Violet lake No. 1 | 0.007 |
| MgO | 0.16 |
| Wheat feed flour | 20.0 |
| Corn flour | 6.1 |
| Water | 15 |
| Sucrose | 18.73 |

The dry pet food thus produced will maintain its meat-like texture and appearance during normal storage. If desired, the dry pet food of the invention may be mixed with conventional dry pet foods and marketed in that manner. Such a mixture is possible due to the low moisture content of the pet food.

Obviously, modifications of this invention are possible. It is understood, therefore, that this application is intended to cover any variations, uses or adaptations of the invention as may be considered to be known or customary practice in the art to which the invention pertains.

Having fully disclosed and described the invention we claim:

1. A method for the production of dry pet food containing less than 15 percent by weight moisture having a soft, elastic, meat-like texture and fibrous appearance comprising the steps of:

A. blending a mixture of amylaceous ingredients, fat, a proteinaceous adhesive, and a plasticizing agent with a sufficient amount of water to produce a product having a moisture content of less than 15 percent by weight and an additional amount of process water; wherein said amylaceous ingredients are present in an amount from about 25 to about 50 percent by weight of the final product; said proteinaceous adhesive is present in an amount of from about 10 to about 25 percent by weight of the final product; said plasticizing agent is present in an amount of from about 5 to 25 percent by weight of the final product;

B. heating said mixture at a temperature between 160°F. and 290°F. for a time sufficient to cook said ingredients and extruding the cooked mixture through a die to form an extrudate; and C. immediately cooling said extrudate by subjecting it to blasts of air; wherein said proteinaceous adhesive is at least one selected from the group consisting of a natural proteinaceous adhesive and a modified proteinaceous adhesive, said amylaceous ingredient is a foodstuff containing a preponderance of starch or starch-like material, and said plasticizing agent is a plasticizer suitable for food use.

2. A method according to claim 1 wherein said proteinaceous adhesive is an alkali modified protein.

3. A method according to claim 1 wherein said alkali modified protein is an alkali modified oil seed vegetable protein.

4. A method according to claim 1 wherein said alkali modified protein is selected from the group consisting of an alkali modified soy protein isolate, alkali modified soy protein concentrate, alkali modified soy flour, alkali modified wheat gluten, and mixtures thereof.

5. A method according to claim 1 wherein said proteinaceous adhesive is selected from the group consisting of collagen, albumen, sodium caseinate, calcium caseinate, potassium caseinate, magnesium caseinate, and ammonium caseinate.

6. A method according to claim 1 wherein said plasticizing agent is selected from the group of glycerol, sorbitol, 1,3-butanediol, mannitol, propylene glycol, and mixtures thereof.

7. A method according to claim 1 wherein said plasticizing agent is selected from the group consisting of sugar syrup, corn syrup, and corn molasses.

8. A method according to claim 1 further including the step of forming the extrudate into fibers, and subdividing the fibers to form pieces.

9. A method according to claim 1 wherein said process water is present in an amount from about 0 to about 15 parts per hundred parts by weight of the product said mixture is cooked at a temperature between 235°F. and 290°F.

10. A method according to claim 1 wherein said process water is present in an amount of greater than 15 parts per hundred parts by weight of the product, said mixture is cooked at a temperature between 160°F. and 235°F.

11. A method according to claim 1 further including the step of drying the cooked mixture by conventional means in order to adjust the final product moisture below 15 percent by weight.

12. A product produced by the method of claim 1.

* * * * *